(12) United States Patent
Fann et al.

(10) Patent No.: US 11,248,124 B2
(45) Date of Patent: Feb. 15, 2022

(54) MOLYBDENUM-SILICON CARBIDE COMPOSITE POWDER AND A FABRICATING METHOD THEREOF

(71) Applicant: Industrial Technology Research Institute, Hsinchu (TW)

(72) Inventors: Yuan-Chang Fann, Hsinchu County (TW); Chun-Mu Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 176 days.

(21) Appl. No.: 16/660,719

(22) Filed: Oct. 22, 2019

(65) Prior Publication Data

US 2020/0199370 A1    Jun. 25, 2020

(30) Foreign Application Priority Data

Dec. 24, 2018  (TW) .................. 107146836

(51) Int. Cl.
*C09C 1/28*    (2006.01)
*B33Y 70/00*   (2020.01)

(52) U.S. Cl.
CPC ............... *C09C 1/28* (2013.01); *B33Y 70/00* (2014.12); *C01P 2002/72* (2013.01); *C01P 2002/85* (2013.01); *C01P 2004/03* (2013.01); *C01P 2004/04* (2013.01); *C01P 2004/61* (2013.01); *C01P 2004/62* (2013.01); *C01P 2004/64* (2013.01); *C01P 2004/80* (2013.01)

(58) Field of Classification Search
CPC ....................................................... C09C 1/28
See application file for complete search history.

(56) References Cited

U.S. PATENT DOCUMENTS 7,226,671 B2   6/2007  Giesler et al.
2018/0215668 A1  8/2018  Yuasa et al.

FOREIGN PATENT DOCUMENTS

| CN | 101844936 | 9/2010 |
| CN | 103387422 | 11/2013 |
| CN | 106282927 | 1/2017 |
| TW | 370566 | 9/1999 |

OTHER PUBLICATIONS

Riccardo Casati et al., "Metal Matrix Composites Reinforced by Nano-Particles—A Review", Metals, vol. 4, Mar. 10, 2014, pp. 65-83.
Atsushi Hibino et al., "Observation of Reaction Mechanisms for Combustion Synthesis of Mo—Al Intermetallic Compounds by Dipping Experiment of Mo Wire into Al Melt", Journal of the Japan Society of Powder and Powder Metallurgy, vol. 59, Issue 12, Jul. 2012, pp. 700-706.
Norbert Ponweiser et al., "Phase equilibria in the Al—Mo—Si system, Norbert Ponweiser", Intermetallics, vol. 19, Dec. 2010, pp. 409-418.
Li Shun et al., "Preparation of Molybdenum Coating on Surfaceof SiC Particles by Sol-Gel Method", Advanced MaterialsResearch, vol. 721, Jul. 31, 2013, pp. 224-228.

*Primary Examiner* — Alexandre F Ferre
(74) *Attorney, Agent, or Firm* — JCIPRNET

(57) ABSTRACT

Molybdenum-silicon carbide composite powder and a fabrication method thereof are provided. The molybdenum-silicon carbide composite powder includes a micro-scale silicon carbide powder and a plurality of submicron-scale molybdenum particles bonding on the surface of the silicon carbide powder.

18 Claims, 5 Drawing Sheets

MOLYBDENUM-SILICON CARBIDE COMPOSITE POWDER AND A FABRICATING METHOD THEREOF

CROSS-REFERENCE TO RELATED APPLICATION

This application claims the priority benefit of Taiwan application serial no. 107146836, filed on Dec. 24, 2018. The entirety of the above-mentioned patent application is hereby incorporated by reference herein and made a part of this specification.

TECHNICAL FIELD

The present disclosure relates to molybdenum-silicon carbide composite powder and a fabrication method thereof.

BACKGROUND

Silicon carbide has the characteristics of low density, low thermal expansion coefficient, high elastic modulus, excellent thermal conductivity, high hardness, high-temperature resistance and the like, so that the silicon carbide is more suitable for being used as a strengthening phase of a metal matrix composite material than other ceramic materials. However, the silicon carbide has ultrahigh surface energy (about 3800 $mJ/m^2$), so that it is very difficult for the silicon carbide to generate interface wetting with metal matrix with low surface energy to realize mutual bonding.

In order to improve the interface wetting between the silicon carbide and the metal matrix, following methods are developed: silicon carbide powder is subjected to silicon oxide sol-gel dip coating, and is then subjected to high-temperature sintering; the silicon oxide powder is subjected to high-temperature oxidization treatment under atmospheric, so as to create nanoscale silicon oxide layer on the surface; a copper layer is formed on a surface of the silicon carbide powder in a chemical plating method; and a nickel layer is formed on the surface of the silicon carbide powder in an electroless plating method. However, the above-mentioned methods still have defects and limitation.

SUMMARY

The present disclosure provides a molybdenum-silicon carbide composite powder. A plurality of submicron-scale molybdenum particles are arranged on a surface of the molybdenum-silicon carbide composite powder.

The present disclosure provides a fabrication method of the molybdenum-silicon carbide composite powder, which is used for fabrication the molybdenum-silicon carbide composite powder with a plurality of submicron-scale molybdenum particles on the surface.

The molybdenum-silicon carbide composite powder of the present disclosure includes a micron-scale silicon carbide particle and a plurality of submicron-scale molybdenum particles. The molybdenum particles bond on a surface of the silicon carbide particle.

The fabrication method of the molybdenum-silicon carbide composite powder of the present disclosure includes the following steps: adding silicon carbide powder into molybdenum trioxide sol-gel, so as to form a mixture; sintering the mixture, so that the molybdenum trioxide is cured and attached onto the partial surface of the silicon carbide powder; and heating the silicon carbide powder attached with the molybdenum trioxide in a hydrogen atmosphere at a temperature higher than the melting point of the molybdenum trioxide, so as to form a silicon carbide particle with a plurality of molybdenum particles attached onto the partial surface.

Based on the above, in the molybdenum-silicon carbide composite powder of the present disclosure, the molybdenum particles bond on the partial surface of the silicon carbide particle through covalent bonds, so that the surface of the molybdenum-silicon carbide composite powder has low surface energy, so as to be favourable for generating interface reactive wetting with low-surface-energy of metals or alloys.

In order to make the aforementioned and other objectives and advantages of the present invention comprehensible, embodiments accompanied with figures are described in detail below.

DETAILED DESCRIPTION OF DISCLOSED EMBODIMENTS

Figure 1A:
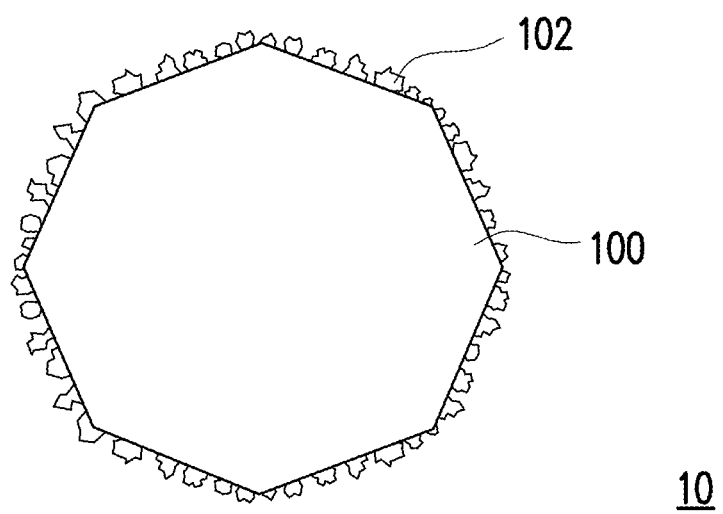
FIG. 1A is a schematic cross-sectional view of molybdenum-silicon carbide composite powder according to an embodiment of the present disclosure.
Figure 1B:
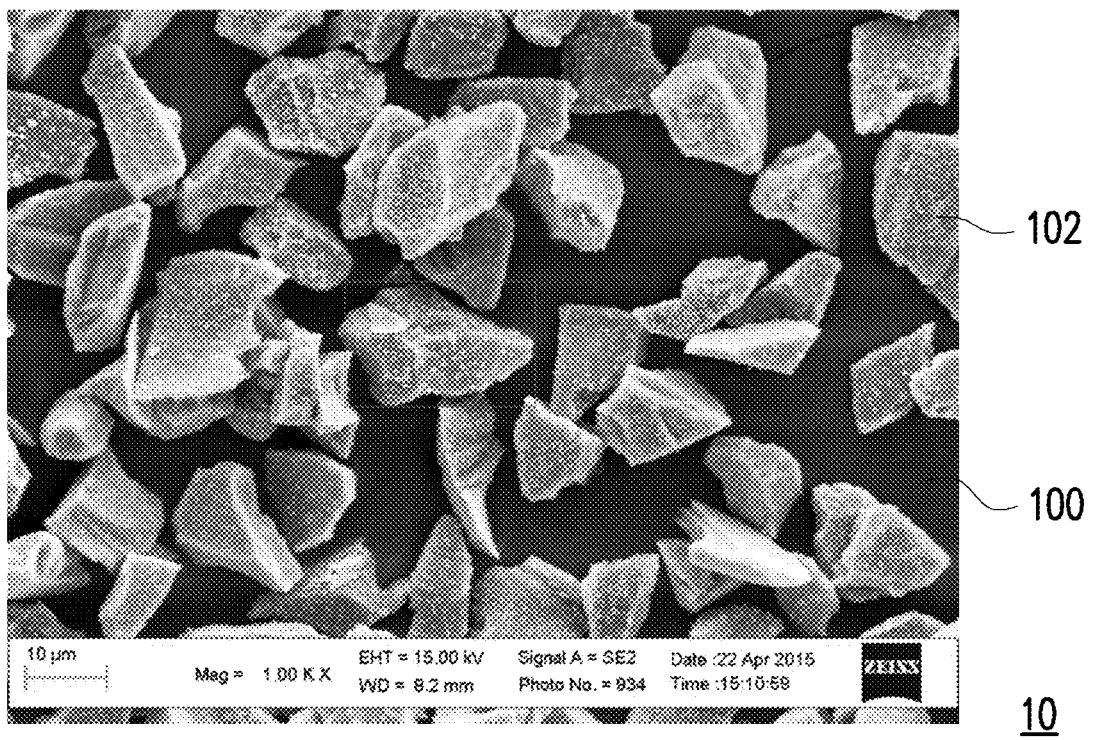
FIG. 1B is a scanning electron microscope image of the molybdenum-silicon carbide composite powder according to the embodiment of the present disclosure.

FIG. 1A is a schematic cross-sectional view of molybdenum-silicon carbide composite powder according to an embodiment of the present disclosure. FIG. 1B is a scanning electron microscope image of the molybdenum-silicon carbide composite powder according to the embodiment of the present disclosure. Referring to FIG. 1A and FIG. 1B at the same time, a molybdenum-silicon carbide composite powder 10 includes a silicon carbide particle 100 and a plurality of molybdenum particles 102. The silicon carbide particle 100 has a micron-scale particle diameter. For example, the particle diameter of the silicon carbide particle 100 is, such as, between 1 micron and 20 microns, but the present disclosure is not limited thereto. Additionally, the molybdenum particles 102 have a submicron-scale particle diameter. Generally, the submicron means a range smaller than 1 micron. For example, the particle diameter of the molybdenum particles 102 is, such as, between 50 nm and 450 nm, but the present disclosure is not limited thereto. A ratio of the length to the width of the molybdenum particles 102 is, for example, between 1 and 1.5, and the shape of the molybdenum particles 102 may be a round shape, an elliptical shape, a polygonal shape or a combination thereof.

The silicon carbide particle 100 is a polyhedral particle. The molybdenum particles 102 bond on a surface of the silicon carbide particle 100 through covalent bonds, and cover 10% to 60% of the surface of the silicon carbide particle 100. In other words, the molybdenum particles 102 cover the partial surface of the silicon carbide particle 100 in a discontinuous way, and it is different from a structure of continuously covering the silicon carbide particle by a molybdenum layer in a magnetron sputtering way in the prior art.

In the present disclosure, the molybdenum particles 102 bond on the partial surface of the silicon carbide particle 100 through the covalent bonds, and the surface of the molybdenum-silicon carbide composite powder 10 is enabled to have low surface energy, so that the molybdenum-silicon carbide composite powder 10 favourably generates interface reactive wetting with a matrix of low-surface-energy metal or alloy (for example, copper alloy, aluminium alloy, titanium alloy, nickel alloy and the like) to realize mutual bonding.

Additionally, the molybdenum-silicon carbide composite powder 10 is favourable for bonding with the matrix of low-surface-energy metal or alloy, so that the molybdenum-silicon carbide composite powder 10 may be used for a strengthening phase of a metal matrix composite material, and may be widely applied to strengthening phases of various alloy and intermetallic compounds by combining the characteristics of low thermal expansion, high-temperature resistance and the like of silicon carbide and molybdenum. Powder used for 3D printing may be further fabricated through a high-cooling-rate atomization process of a molten metal matrix composite material.

Figure 2A:
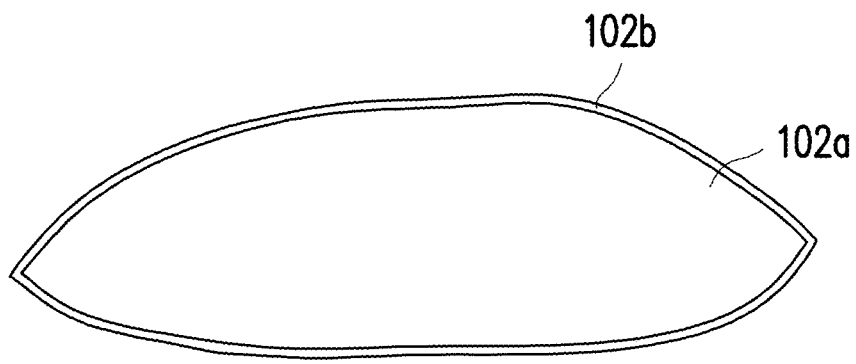
FIG. 2A is a schematic view of molybdenum particles according to the embodiment of the present disclosure.
Figure 2B:
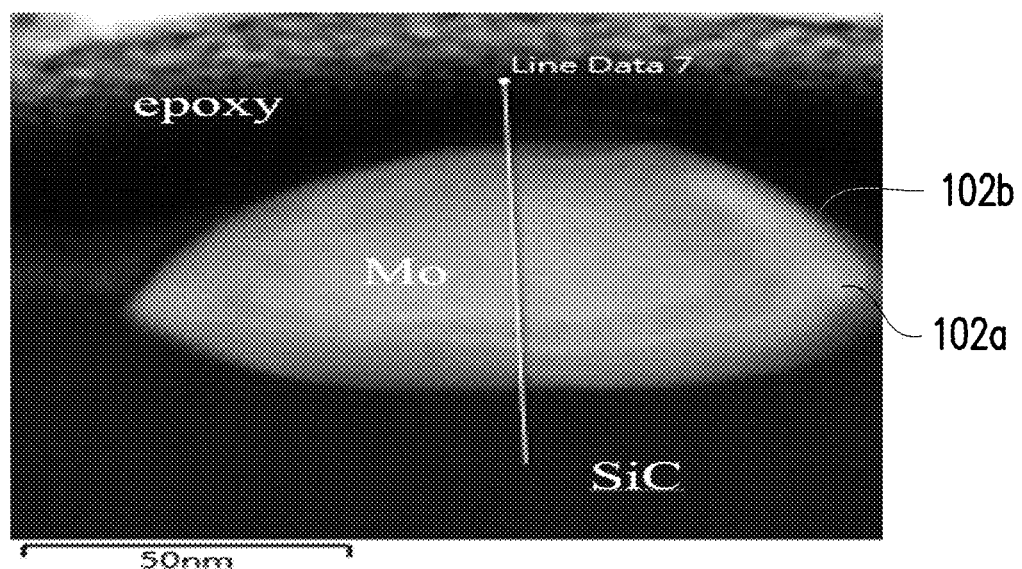
FIG. 2B is a transmission electron microscope image of molybdenum particles positioned on a surface of a silicon carbide particle according to the embodiment of the present disclosure.
Figure 2C:
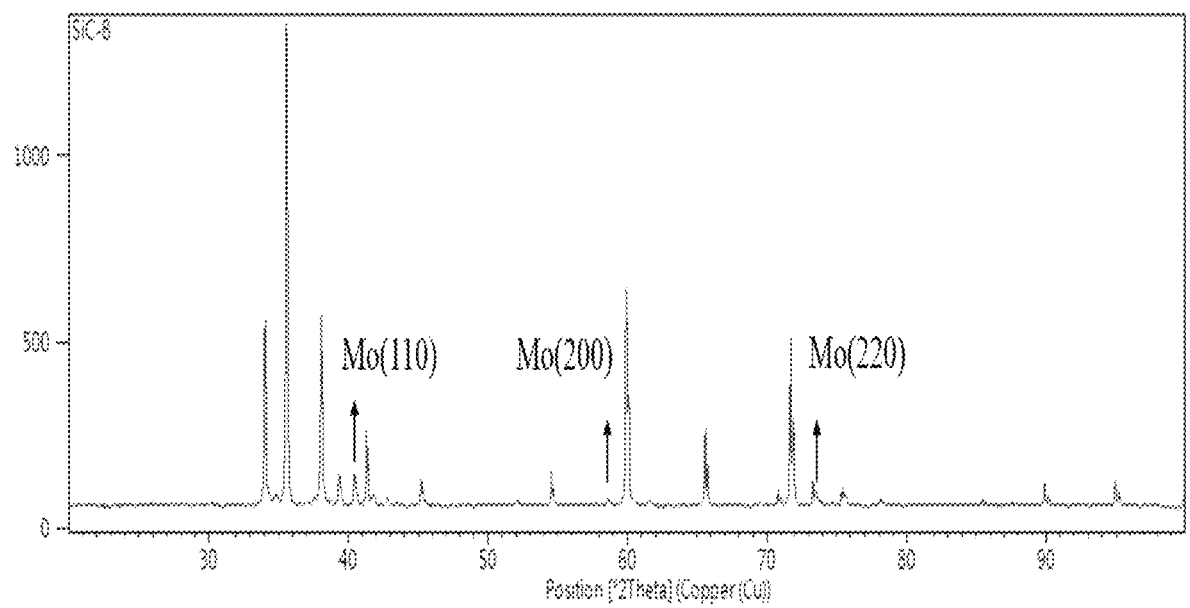
FIG. 2C is an X-ray diffraction pattern of the molybdenum particles positioned on a surface of the silicon carbide particle according to the embodiment of the present disclosure.
Figure 2C:
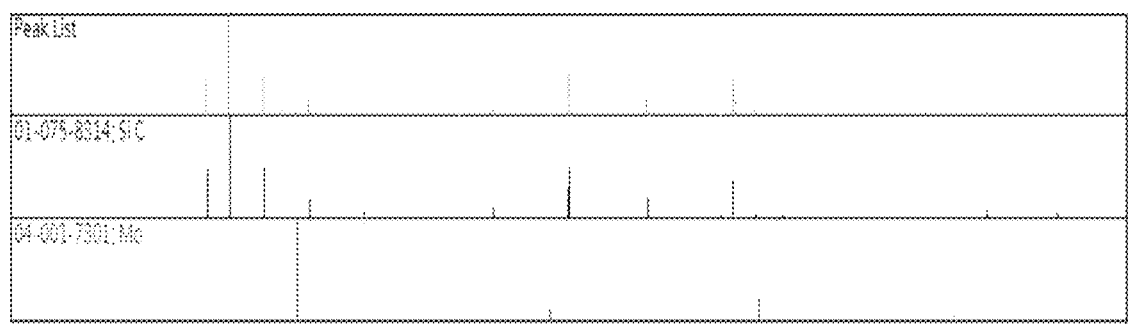
Figure 2D:
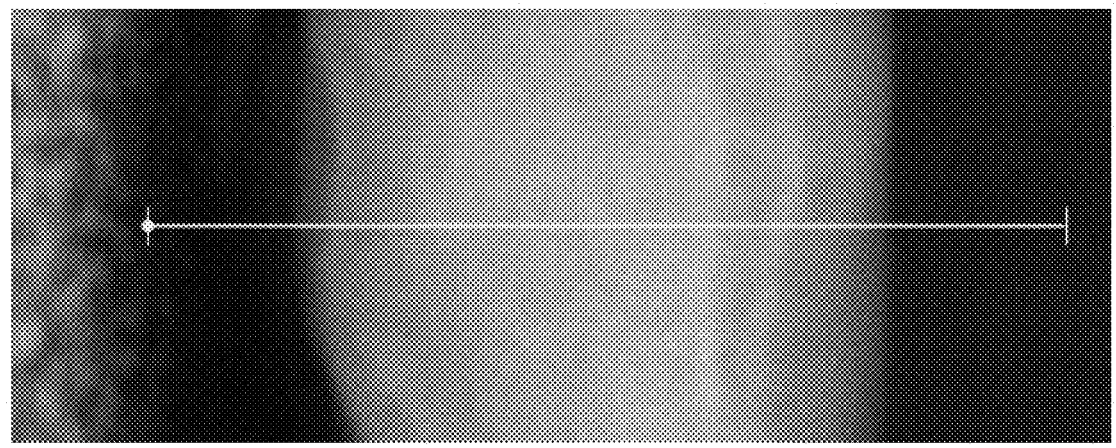
FIG. 2D is a x-ray energy-dispersive spectroscopy (EDS) line scanning profile of a molybdenum particle of the molybdenum-silicon carbide composite powder according to another embodiment of the present disclosure.
Figure 2D:
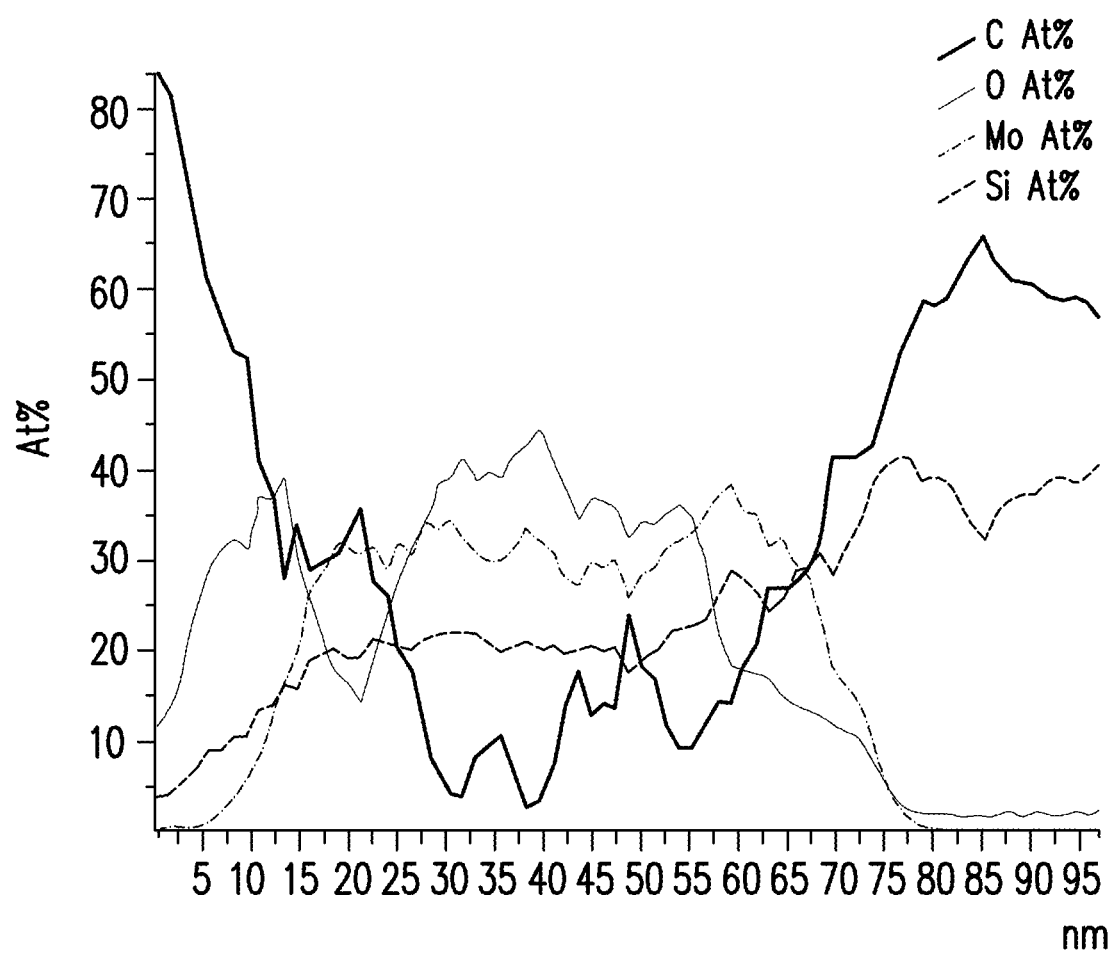

On the other hand, in the embodiment of the present disclosure, the molybdenum particle 102 has a core-shell structure. As shown in FIG. 2A and FIG. 2B, the molybdenum particle 102 has a core 102a and a shell 102b. The core 102a includes a main constituent element of molybdenum, and a material thereof is, for example, metallic molybdenum proved from result of FIG. 2C. The shell 102b includes main constituent elements of at least molybdenum and silicon, and a material thereof is, for example, a compound produced by molybdenum and silicon. Additionally, depending on a hydrogen gas reduction temperature of the molybdenum particles 102, the shell 102b may also contain carbon. The sample of the FIG. 2B and FIG. 2D is prepared as followed, molybdenum-silicon carbide composite powder placed within a metal mesh and fixed with epoxy. FIG. 2D is the result of combing a local amplification of FIG. 2B under 90 degrees anticlockwise rotation and a x-ray energy-dispersive spectroscopy (EDS) line scanning profile. In addition, in another embodiment, the shell 102b may also contain oxygen due to oxidization influence. In the molybdenum particle 102, the shell 102b contains molybdenum, silicon, oxygen and carbon as shown in FIG. 2D.

A fabrication method of the molybdenum-silicon carbide composite powder of the present disclosure is illustrated hereafter.

Figure 3:
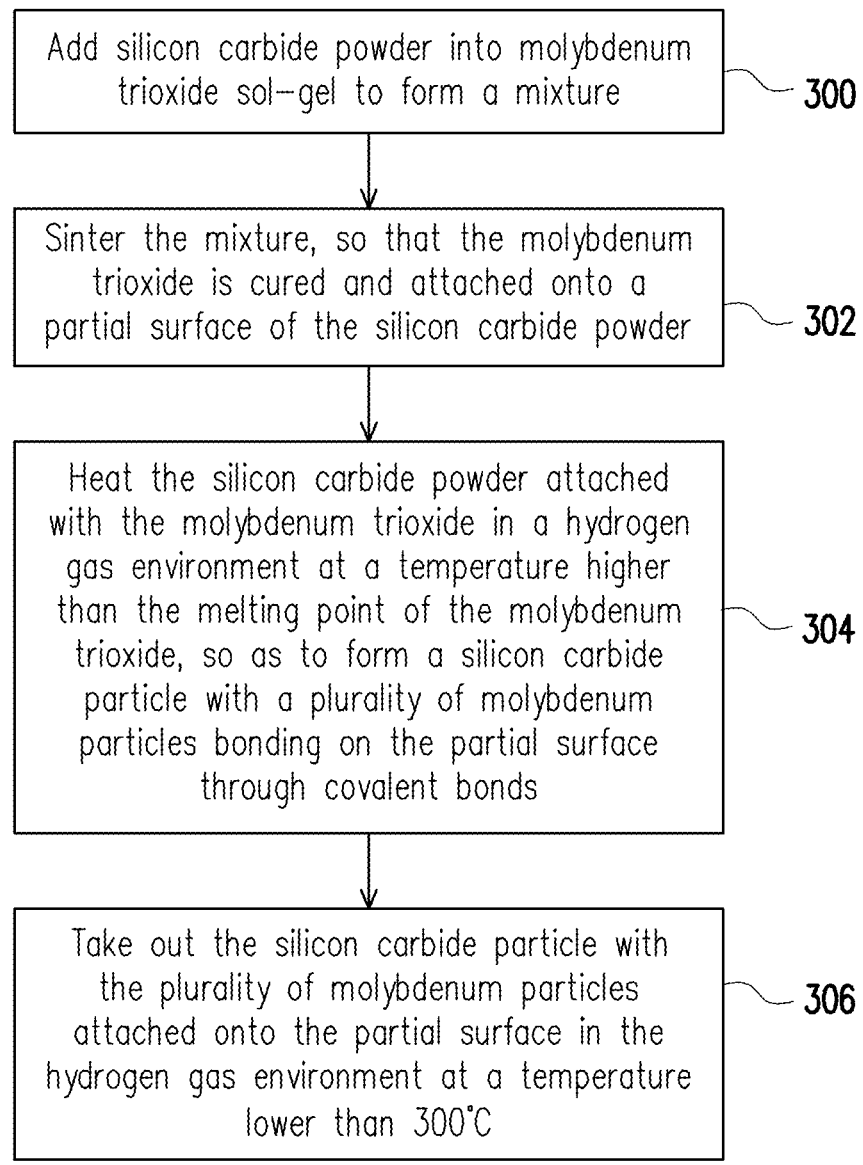
FIG. 3 is a fabrication flow diagram of the molybdenum-silicon carbide composite powder according to an embodiment of the present disclosure.

FIG. 3 is a fabrication flow diagram of the molybdenum-silicon carbide composite powder according to an embodiment of the present disclosure. Referring to FIG. 3, firstly, in step 300, yellow molybdenum trioxide ($MoO_3$) sol-gel is put into a container, and then, silicon carbide powder is added into the molybdenum trioxide sol-gel to form a mixture. Then, stirring is performed at a temperature lower than 80° C., so that the mixture is gradually dried. In the embodiment of the present disclosure, the molybdenum trioxide sol-gel may be prepared in a following steps: soaking molybdenum wires or molybdenum powder into a container with 25%-60% hydrogen peroxide, so as to oxidize molybdenum metal to obtain a reddish brown or yellow molybdic hydroxide $Mo(OH)_6$ solution; then, stirring the $Mo(OH)_6$ solution and gradually adding ethyl alcohol and acetic acid; and next, heating at a temperature lower than 80° C., so that the molybdenum trioxide condenses, ethyl acetate is produced, and the molybdenum trioxide sol-gel is obtained.

Then, in step 302, the mixture is sintered and cured, so that the molybdenum trioxide is attached onto the partial surface of the silicon carbide powder. In the embodiment of the present disclosure, the sintering curing is, for example, performed in a heating furnace at a temperature of 200° C. to 450° C.

Then, in step 304, the silicon carbide powder attached with the molybdenum trioxide is heated in a hydrogen atmosphere at a temperature higher than the melting point (about 802° C.) and close to the boiling point (about 1155° C.) of the molybdenum trioxide, so that the molybdenum trioxide takes a hydrogen reduction reaction to form a plurality of nanoscale molybdenum particles bonding on the partial surface of the silicon carbide powder. In the embodiment of the present disclosure, the heating temperature is, for example, a temperature higher than the melting point of the molybdenum trioxide and close to the boiling point of the molybdenum trioxide, and is, for example, between 1100° C. and 1250° C. Additionally, the time of the reduction reaction is, for example, 5 min to 20 min.

Next, in step 306, the silicon carbide particle with the molybdenum particles bonding on the partial surface through the covalent bonds is taken out in the hydrogen atmosphere at a temperature lower than 300° C. In this step, the silicon carbide particle with the molybdenum particles bonding on the partial surface through the covalent bonds is taken out in the hydrogen atmosphere, so that the generation of oxidation reaction of the molybdenum particles due to the contact with atmosphere environment may be minimized.

A practical fabrication flow process of the molybdenum-silicon carbide composite powder of the present disclosure is illustrated by an experimental embodiment hereafter.

Experimental Embodiment

The molybdenum trioxide sol-gel is prepared. Main raw materials include 30% hydrogen peroxide and molybdenum wires with a diameter of 0.18 mm. 16 g of molybdenum wires are soaked into the hydrogen peroxide. The molybdenum wires take oxidization reaction for producing a molybdenum hydroxide solution or molybdenum hydroxide hydrate. In order to reduce water content and to increase the viscosity of the molybdenum trioxide sol-gel, the molybdenum hydroxide solution is heated to about 70° C. Then, several millilitres of 95% ethyl alcohol and acetic acid are added into the solution; continuous stirring is performed to accelerate the production of ethyl acetate to increase the viscosity, and the yellow molybdenum trioxide sol-gel is obtained.

Then, 200 g of 1200-mesh silicon carbide powder and the above-mentioned molybdenum trioxide sol-gel are mixed through stirring. Heating curing is performed in atmosphere at a temperature of 200° C. to 450° C., so that the solid molybdenum trioxide is precipitated and attached onto the partial surface of the silicon carbide powder. The fine needle-shaped or flaky solid molybdenum trioxide may be more easily precipitated when the temperature of a heating furnace is lower and closer to 200° C.

Then, the obtained silicon carbide powder is put into a temperature-resistant boat-shaped molybdenum container, and is heated for 5 min to 10 min in a reduction furnace with hydrogen atmosphere at a temperature of 1100° C. to 1250° C., and then cooled to room temperature in the hydrogen atmosphere, so as to obtain molybdenum-silicon carbide composite powder.

Additionally, the obtained molybdenum-silicon carbide composite powder may be used to be combined with molten high-entropy alloy (such as $Al_{0.5}FeMnTiCrSi_{1.5}$) and a molten TiAl matrix intermetallic compound (such as $TiAl_{47}Cr_2Nb$), and then atomized into spherical powder at a cooling rate of $10^{3}$° C./s to $10^{6}$° C./s, so as to be used as 3D printing powder.

What is claimed is:

1. A molybdenum-silicon carbide composite powder, comprising:
   a micron-scale silicon carbide particle; and
   a plurality of submicron-scale molybdenum particles, bonding on a surface of the silicon carbide particle through covalent bonds, wherein each molybdenum particle comprises a core-shell structure, the material of a core of the core-shell structure is molybdenum, and a shell of the core-shell structure at least contains molybdenum and silicon.

2. The molybdenum-silicon carbide composite powder according to claim 1, wherein a particle diameter of the molybdenum particles is between 50 nm and 450 nm.

3. The molybdenum-silicon carbide composite powder according to claim 1, wherein the molybdenum particles cover 10% to 60% of the surface of the silicon carbide particle.

4. The molybdenum-silicon carbide composite powder according to claim 1, wherein the shell further contains oxygen and/or carbon.

5. The molybdenum-silicon carbide composite powder according to claim 1, wherein a ratio of the length to the width of each molybdenum particle is between 1 and 1.5.

6. The molybdenum-silicon carbide composite powder according to claim 1, wherein a particle diameter of the silicon carbide particle is between 1 micron and 20 microns.

7. The molybdenum-silicon carbide composite powder according to claim 1, wherein the molybdenum particles cover the surface of the silicon carbide particle in a discontinuous way.

8. A fabrication method for making the molybdenum-silicon carbide composite powder according to claim 1, comprising:
   adding silicon carbide powder into molybdenum trioxide sol-gel, so as to form a mixture;
   sintering the mixture, so that the molybdenum trioxide is cured and attached onto a partial surface of the silicon carbide powder; and
   heating the silicon carbide powder attached with the molybdenum trioxide in a hydrogen atmosphere at a temperature higher than the melting point of the molybdenum trioxide, so as to form a silicon carbide particle with a plurality of molybdenum particles bonding on the partial surface through covalent bonds.

9. The fabrication method of the molybdenum-silicon carbide composite powder according to claim 8, further comprising a step of after the silicon carbide particle with the plurality of molybdenum particles bonding on the partial surface are formed, taking out the silicon carbide particle with the plurality of molybdenum particles bonding on the partial surface through covalent bonds in the hydrogen atmosphere at a temperature lower than 300° C.

10. The fabrication method of the molybdenum-silicon carbide composite powder according to claim 8, wherein the temperature higher than the melting point of the molybdenum trioxide is between 1100° C. and 1250° C.

11. The fabrication method of the molybdenum-silicon carbide composite powder according to claim 8, wherein the mixture is sintered and cured at a temperature between 200° C. and 450° C.

12. The fabrication method of the molybdenum-silicon carbide composite powder according to claim 8, wherein a particle diameter of the molybdenum particles is between 50 nm and 450 nm.

13. The fabrication method of the molybdenum-silicon carbide composite powder according to claim 8, wherein the molybdenum particles cover 10% to 60% of the surface of the silicon carbide particle.

14. The fabrication method of the molybdenum-silicon carbide composite powder according to claim 8, wherein each molybdenum particle comprises a core-shell structure.

15. The fabrication method of the molybdenum-silicon carbide composite powder according to claim 14, wherein the material of a core of the core-shell structure is molybdenum, and a shell of the core-shell structure at least contains molybdenum and silicon.

16. The fabrication method of the molybdenum-silicon carbide composite powder according to claim 15, wherein the shell further contains oxygen and/or carbon.

17. The fabrication method of the molybdenum-silicon carbide composite powder according to claim 8, wherein a ratio of the length and the width of each molybdenum particle is between 1 and 1.5.

18. The fabrication method of the molybdenum-silicon carbide composite powder according to claim 8, wherein the molybdenum particles cover the surface of the silicon carbide particle in a discontinuous way.

* * * * *